Figures 8, 9:
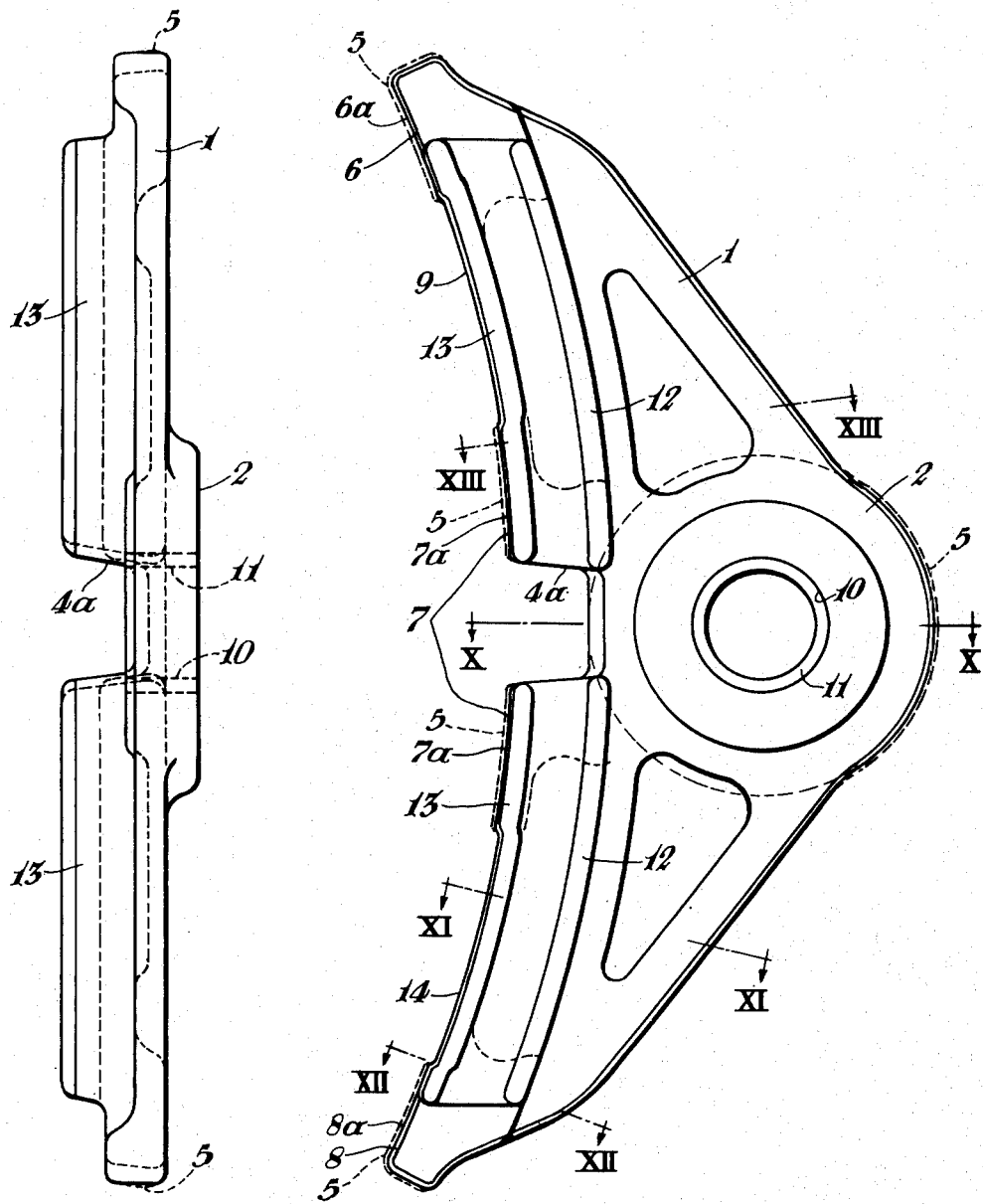

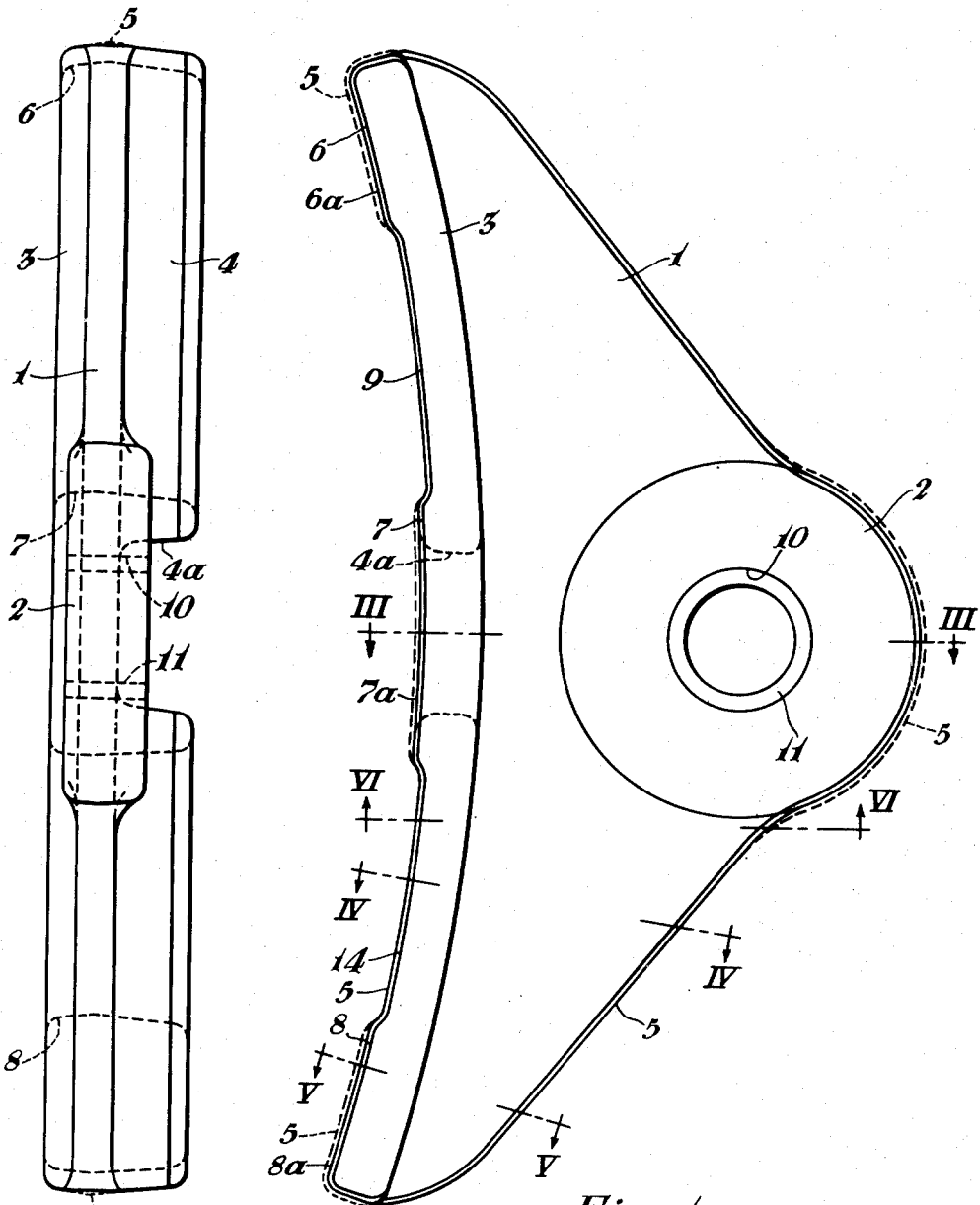

Jan. 12, 1954
C. G. SMITH ET AL
2,665,779
FORGED AND WELDED BRAKE HEAD
Filed June 29, 1949
4 Sheets-Sheet 2
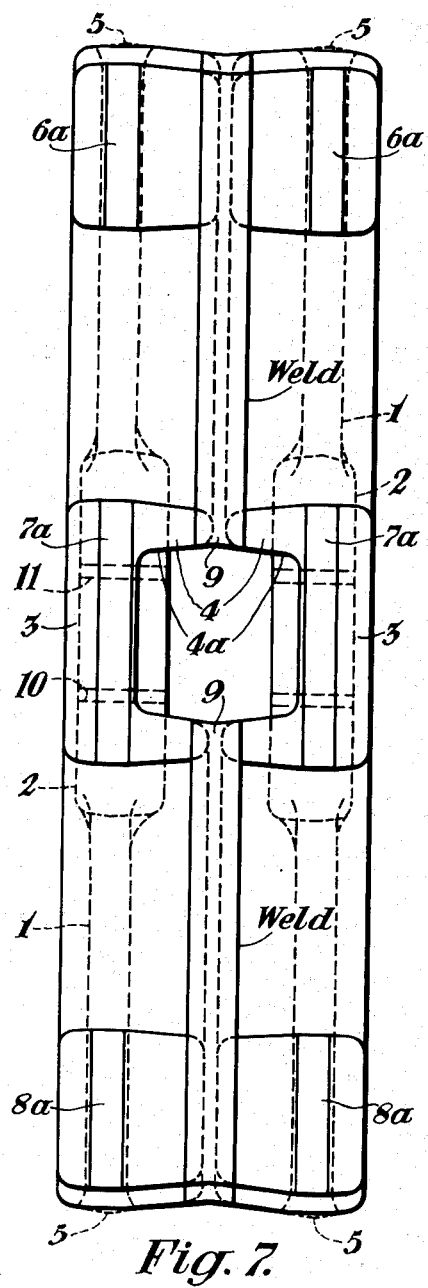
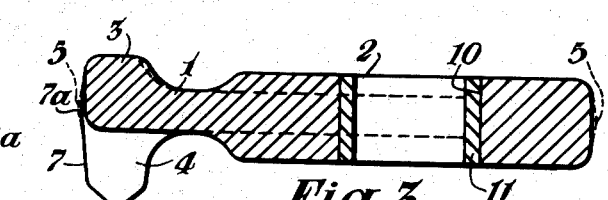
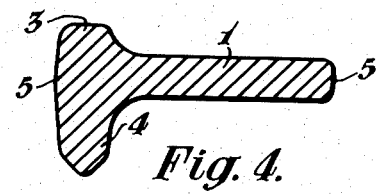
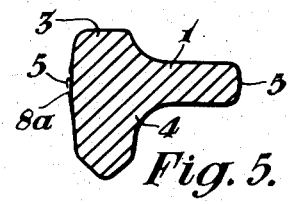
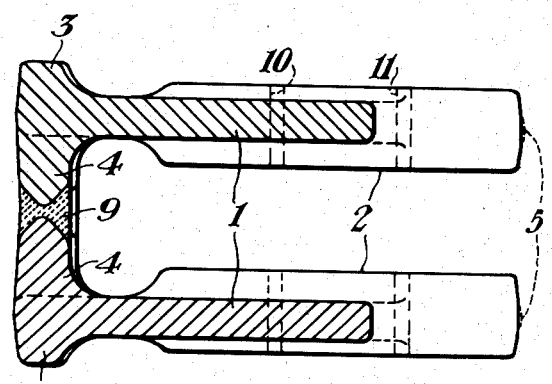
INVENTORS.
Charles G. Smith and
Daniel A. Best
BY
THEIR ATTORNEY Jan. 12, 1954

C. G. SMITH ET AL 2,665,779

FORGED AND WELDED BRAKE HEAD

Filed June 29, 1949

4 Sheets-Sheet 3

INVENTORS
Charles G. Smith and
BY Daniel A. Best.

THEIR ATTORNEY

Jan. 12, 1954
C. G. SMITH ET AL
2,665,779
FORGED AND WELDED BRAKE HEAD
Filed June 29, 1949
4 Sheets-Sheet 4
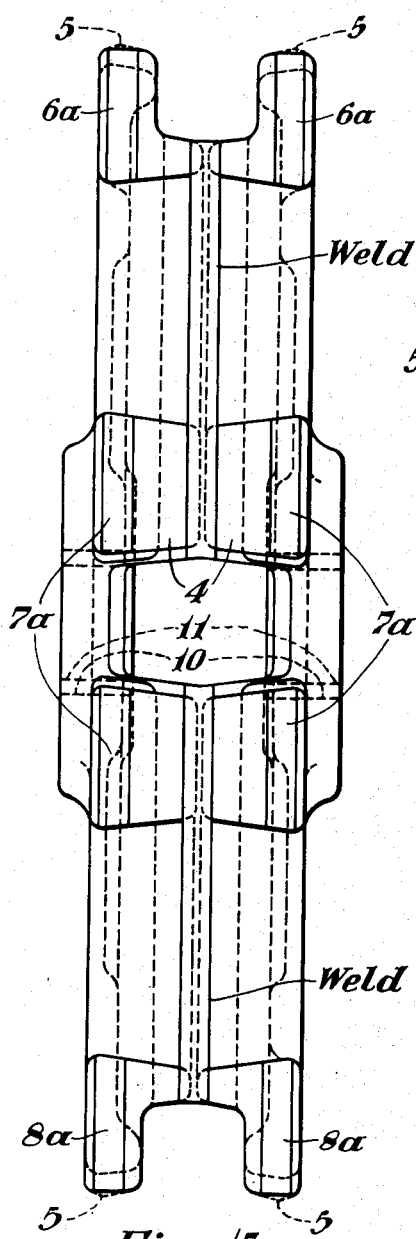
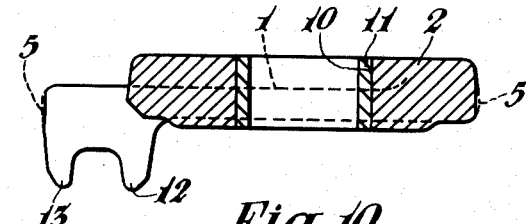
Fig. 10.
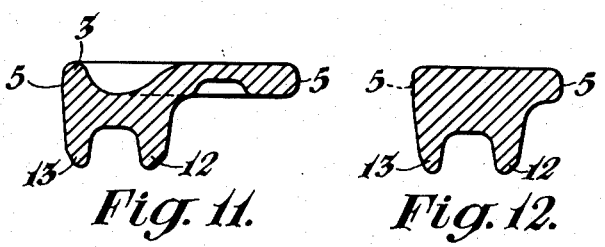
Fig. 11.    Fig. 12.
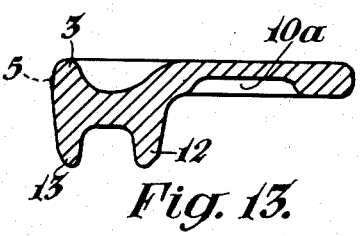
Fig. 13.
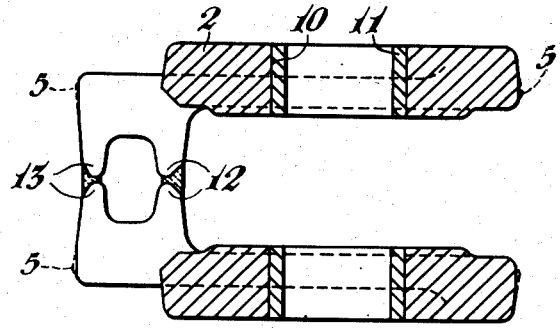
Fig. 14.
Fig. 15.
INVENTORS.
Charles G. Smith and
Daniel A. Best
BY
THEIR ATTORNEY Patented Jan. 12, 1954

2,665,779

UNITED STATES PATENT OFFICE 2,665,779

FORGED AND WELDED BRAKE HEAD

Charles G. Smith, Wilkinsburg, and Daniel A. Best, East McKeesport, Pa., assignors to The American Brake Company, Swissvale, Pa., a corporation of Missouri Application June 29, 1949, Serial No. 101,998

5 Claims. (Cl. 188—236)

Our invention relates to brake heads, and particularly to brake heads made up of forged parts.

Commercial brake heads have commonly been manufactured as steel or malleable castings. It has been found that such castings are sometimes subject to an objectionably high percentage of rejections due to flaws produced during the casting process. Furthermore, such castings are difficult to hold within close manufacturing tolerances, and it is consequently necessary to do a considerable amount of machining on the cast brake heads before they are suitable for use.

It is an object of our invention to provide a brake head made up of forged parts.

Another object is to provide such a brake head made up of similar parts welded together.

Another object is to provide such parts welded together in such a way that only minimum forces are transmitted through the weld.

We accomplish the foregoing and other objects of our invention by building the brake head from two similar parts. Each part is forged and consists of a flat wall or web, a central boss formed on the web adjacent its rear edge and apertured to receive the brake head pin, and a laterally projecting flange formed on the web adjacent its front edge. The front edge of the web is contoured to provide an arcuate bearing surface for engaging a brake shoe. We form this bearing surface by trimming the ridge left by the forging die with a force-trimming die, so as to provide a surface of accurate dimensions and location with respect to the brake head pin. The two forged and trimmed parts are then assembled in a fixture with the edges of the flanges facing each other, and are welded together along the edges of the flanges.

In an alternative construction, a second laterally projecting flange parallel to the other flange is provided on the web of each part at its forward edge, and after the trimming operation is completed, the two parts are assembled in a fixture with the edges of both flanges in confronting relation, and the confronting ends of the flanges are welded together to form a box section.

We shall describe two forms of brake heads embodying our invention and the methods by which they are manufactured, and shall then point out the novel features thereof in claims.

In the accompanying drawings, Fig. 1 is an elevational view of one form of a brake head part constructed in accordance with our invention and adapted to form a complete brake head when welded to another similar part. Fig. 2 is a right-hand view of the brake head part shown in Fig. 1. Figs. 3, 4, and 5 are sectional views taken respectively on the lines III—III, IV—IV, and V—V of Fig. 1, looking in the direction of the arrows. Fig. 6 is a sectional view of a complete brake head formed of two parts such as those shown in Fig. 1, welded together, the individual parts being shown in section along line VI—VI of Fig. 1, looking in the direction of the arrows. Fig. 7 is an elevational view of a complete brake head, looking toward the brake shoe receiving surface thereof. Fig. 8 is an elevational view of another form of brake head part constructed in accordance with our invention and adapted to form a complete brake head when welded to another similar part. Fig. 9 is a right-hand view of the brake head part shown in Fig. 8. Figs. 10, 11, 12, and 13 are sectional views taken respectively on the lines X—X, XI—XI, XII—XII, and XIII—XIII of Fig. 8. Fig. 14 is a sectional view of a completed brake head made up of two parts constructed as shown in Figs. 8 to 13, each part being shown as a section taken on the line X—X of Fig. 8. Fig. 15 is a front elevational view of a completed brake head constructed from two parts of the type shown in Figs. 8 to 13.

Similar reference characters designate similar parts in each of the several views.

Figs. 1 to 5 illustrate various views of a single forged part for constructing one form of brake head embodying our invention. Two of these parts, when welded together, form a complete brake head, as shown in Figs. 6 and 7.

Referring to Figs. 1 to 5, it may be seen that the brake head part comprises a flat wall or web 1, of generally triangular formation, having a raised central boss 2 at the apex of the triangle, and having opposed flanges 3 and 4 along the opposite edge of the web 1, which forms the base of the triangle.

As is commonly the case in forging operations, the sides of the forging dies are tapered, so that the piece leaves the forging dies with a ridge, shown at 5, extending around its entire periphery.

The outer face of the flange 3 of the forged piece is provided with three spaced projections 6, 7, and 8 separated by recesses 9 and 14. We provide accurately formed bearing surfaces on the flanged face of the piece preferably by placing it in a trimming die which removes part of the material left in the ridge 5 by the forging die. This material is removed from the ridges 5 along the projections 6, 7, and 8. The trimming die may also be used to remove some of the material at each end of the projections 6 and 8 to insure proper shoe fit. In order to balance the trimming operation, we also remove material from the ridged side along the outer periphery of the boss 2. This dimensioning of the boss 2 also provides an accurate outer surface for that boss, so that it may be used as a locating surface, as hereinafter described.

The bearing surfaces formed by the trimming process on the projections 6, 7, and 8 are shown at 6a, 7a, and 8a in Fig. 7. See also Figs. 1, 3, and 5.

After the forging and trimming operations, the piece is placed in a suitable fixture (not shown). For example, the fixture may hold the piece rigidly at the ends of the flanges 3 and 4, and at the outer periphery of the boss 2, which has been trimmed to provide an accurate surface. Another similar piece is inserted in the same fixture, the two pieces being held in substantially the relative positions shown in Fig. 6. In these positions, the facing edges of the flanges 4 of the two pieces are spaced partly from each other, and the bosses 2 are aligned with, but spaced from, each other. The facing edges of the two flanges 4 are then welded together, as indicated at 9.

The flanges 4 are provided with central recesses 4a. When the two pieces are welded together, the recesses 4a are opposite each other and together form an aperture through which a locking lug on the brake shoe may be inserted in a well-known manner.

A hole 10 is formed in the boss 2, and a bushing 11 is inserted in the hole 10. The hole 10 may be suitably formed in several different ways. For example, it may be punched out as part of the forging process, by the use of a projecting insert in the forging die. Alternatively, the hole 10 may be drilled in the piece after it is forged and trimmed and the trimmed surfaces are available for accurately locating the hole 10. If this is done, the bushing may be inserted and the hole may be used as the locating surface or as an additional locating surface during the welding operation.

A third method of forming the hole 10 is to make it by drilling after the two pieces are assembled in the fixture, in which case the hole may be drilled either before or after the welding operation.

It should be noted that the three bearing surfaces 6a, 7a, and 8a are of arcuate cross-section, and are concentric with their axis of curvature extending in a direction perpendicular to the plane of the web 1. By virtue of this construction, the braking forces will be applied by a brake head pin extending through the bushing 11 upon a brake shoe resting against the surfaces 6a, 7a, and 8a. It may be seen that these braking forces are not transmitted through the weld 9, but on the contrary pass directly through each of the forged parts to the brake shoe.

Referring now to Figs. 8 to 13, we have here shown another form of forged brake head part which when welded to a similar part forms a brake head of the type shown in Figs. 14 and 15. The part shown in Figs. 8 to 13 is generally similar to the part shown in Figs. 1 to 5 but differs therefrom principally in that it is provided in place of the single flange 4 shown in Figs. 1 to 5 with two flanges 12 and 13 which extend laterally from the web 1 in spaced parallel relation. The brake head part shown in Figs. 8 to 13 is initially forged and trimmed in a manner similar to the parts previously described in detail in connection with Figs. 1 to 5, and the two parts are then assembled in a suitable fixture with the flanges 12 and 13 on the two parts in spaced confronting relation in substantially the relative position shown in Fig. 14. The parts are then welded together at the outside edge of the flange 13 and the inside edge of the flange 12 so as to form a rigid box section.

The brake head shown in Figs. 6 and 7 is particularly suitable for use with a semi-flanged type of brake shoe, while the brake head shown in Figs. 14 and 15 is particularly suitable for use with a flangeless type of brake shoe.

Although we have herein shown and described only two forms of brake heads embodying our invention, it is understood that various changes and modifications may be made therein within the scope of the appended claims without departing from the spirit and scope of our invention.

Having thus described our invention, what we claim is:

1. As a new article of manufacture, a brake head comprising two similar forged parts, each part including a web, a boss formed on the web adjacent one edge, and spaced parallel laterally extending flanges formed on the web adjacent the opposite edge, said flanged edge having bearing surfaces, the flanges of said two parts having facing edges and being welded together along their facing edges to form a box section.

2. A brake head comprising two identical forged parts, each part including a web, a boss formed on the web adjacent one edge of the web and apertured to receive a pin, and a flange formed on the opposite edge of the web, said flanged edge having concentric spaced bearing surfaces of arcuate cross section, said surfaces having an axis of curvature perpendicular to the plane of the web, the flanges on said web having facing edges, and a weld connecting the two forged parts together along the facing edges of the flange.

3. A brake head comprising two identical forged parts, each part including a web, a boss formed on the web adjacent one edge of the web and apertured to receive a pin, and a flange formed on the opposite edge of the web, said flanged edge having concentric spaced bearing surfaces of arcuate cross section, said surfaces having an axis of curvature perpendicular to the plane of the web, the flanges on said web having facing edges, and a weld connecting the two forged parts together along the facing edges of the flange, said flanges having opposed recesses in the facing edges to form an aperture for receiving a locking member.

4. A brake head comprising two identical forged parts, each part including a web, a boss formed on the web adjacent one edge, laterally extending spaced parallel flanges formed on the opposite edge of the web, the flanges of the two parts having facing edges, and spaced concentric bearing surfaces on the flanged edge of said web; and welds connecting the two forged parts together along the facing edges of the flanges, said flanges forming a box section.

5. A brake head comprising two identical forged parts, each part including a web, an apertured boss formed on the web adjacent one edge, laterally extending inner and outer parallel flanges formed on the opposite edge of the web, the flanges of the two parts having facing edges, the outer flange being provided with a centrally disposed recess, and spaced concentric bearing surfaces on the flanged edge of the web; and welds connecting the two forged parts together along the facing edges of the flanges, said flanges forming an apertured box section.

CHARLES G. SMITH.
DANIEL A. BEST.

References Cited in the file of this patent

UNITED STATES PATENTS

| Number | Name | Date |
|---|---|---|
| 686,970 | Crone | Oct. 22, 1907 |
| 1,126,874 | Sargent | Feb. 2, 1915 |
| 1,475,286 | Crone | Nov. 27, 1923 |
| 1,727,874 | Ford | Sept. 10, 1929 |
| 1,947,894 | Whitworth | Feb. 20, 1934 |
| 1,972,212 | Whitworth | Sept. 4, 1934 |
| 2,048,921 | Cox | July 28, 1936 |
| 2,148,257 | Budd | Feb. 21, 1939 |
| 2,255,728 | Baselt | Sept. 9, 1941 |
| 2,593,374 | Whitney | Apr. 15, 1952 |

FOREIGN PATENTS

| Number | Country | Date |
|---|---|---|
| 302,865 | Italy | Nov. 10, 1932 |
| 973,933 | France | Sept. 20, 1950 |